UNITED STATES PATENT OFFICE.

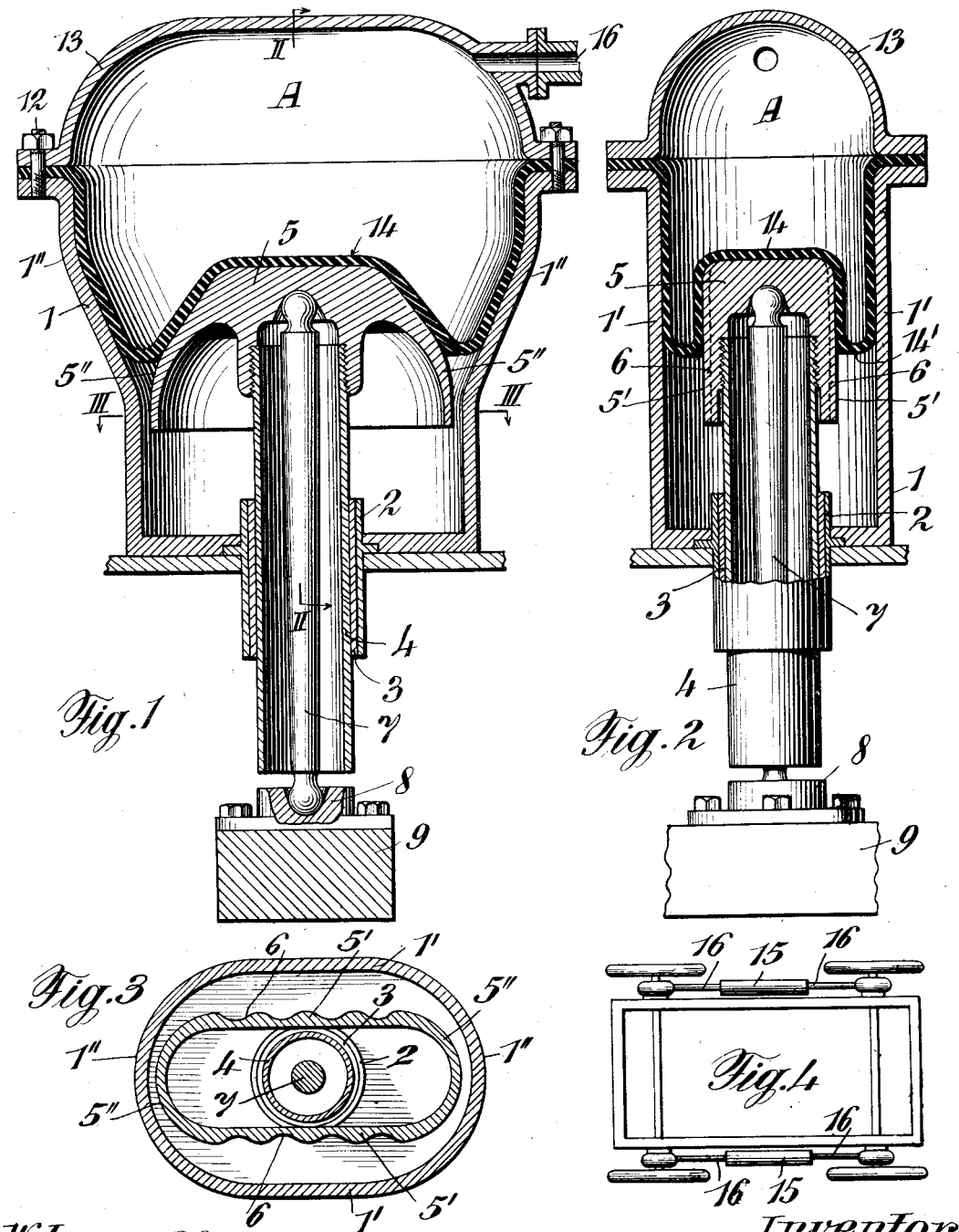

JOSEF HOFMANN, OF BAUMAROCHE, SWITZERLAND.

PNEUMATIC SPRING.

1,077,472.

Specification of Letters Patent.   Patented Nov. 4, 1913.

Application filed July 18, 1912. Serial No. 710,252.

*To all whom it may concern:*

Be it known that I, JOSEF HOFMANN, a subject of the Emperor of Austria-Hungary, residing at Baumaroche, Switzerland, have invented certain new and useful Improvements in Pneumatic Springs, of which the following is a specification.

This invention relates to a pneumatic spring of that type, in which a pneumatic diaphragm is arranged within a rigid receptacle and coöperating with a plunger. In this type of pneumatic springs the plunger is to be made of smaller diameter than the cylinder in order to have a sufficient distance between the plunger and the cylinder, otherwise the diaphragm would be caused to form an arc of a small radius and to break between both members. If the distance between the plunger and the cylinder is made relatively large, the diaphragm forms an arc of a large diameter and is not damaged by the movement of the plunger. But in consequence of the plunger being of smaller diameter than the cylinder the area taken from against the casing is larger than the area put against the plunger when the latter enters the casing. By this reason the diaphragm becomes folded when the plunger enters the cylinder. The distance between the plunger and the cylinder ought to be small so that the difference of the areas of the plunger and the cylinder could be equalized by the elasticity of the diaphragm, but the diaphragm would be damaged by constructing the pneumatic spring in this manner.

According to this invention the distance between the piston and the cylinder is made relatively large and in order to equalize the surfaces of both members the surface of the walls of the plunger is enlarged by any suitable means. By so forming the plunger the diaphragm is put against the wall without becoming folded.

A construction according to this invention is illustrated by way of example in the accompanying drawings in which—

Figure 1 is a longitudinal section through the pneumatic cushion. Fig. 2 is a longitudinal section on line II—II of Fig. 1. Fig. 3 is a cross-section on line III—III of Fig. 1. Fig. 4 shows the device mounted on a vehicle.

The cylinder member or casing 1 of rigid material is mounted on the frame of a car (Fig. 4). For making the best use of the available space between the frame and the wheels of the car, the casing 1 is made of oblong cross-section, as will be best seen from Figs. 3 and 4. The longitudinal walls 1' of the casing are parallel, while the rounded lateral walls 1'' are conical. The lower part of the casing 1 is secured to a box 2 provided with a lining 3 which forms a guide for a tube 4. A piston member or plunger 5 being screwed to the upper end of the tube 4 is also of oblong cross-section, the distance between the longitudinal walls of the casing and the piston being greater than the distance between the lateral walls of said members. The longitudinal walls 5' of the piston are provided with corrugations, furrows or wrinkles 6 and projections between them of any suitable form, while the lateral conical walls 5'' of the piston have a smooth surface. These parts of the piston need not to be provided with corrugations, because at this place by the conical shape of both members the diaphragm is caused to form an arc of a large diameter even if the distance between both members is a small one. The plunger is provided inside with a spherical journal of a supporting rod 7. The lower spherical journal of the rod 7 is suitably supported by plate 8 secured to the axle 9 of the vehicle.

The upper end of the casing 1 is provided with a vaulted cover 13 by means of bolts 12. The edge of a preferably thin pneumatic diaphragm 14 is held tight between the flanges of the casing 1 and the cover 13. The diaphragm partly rests against the inner wall of casing 1 and partly against the plunger 5.

A completely air-tight chamber A is formed by the above described arrangement. This chamber is filled with air and is connected to an air-chamber 15 by a pipe 16.

A pneumatic spring as described above is provided at every wheel of the vehicle. Any suitable number of air chambers may be applied.

The device acts as follows: A pressure exerted from below on the axle 9 causes the plunger 5 to enter somewhat more into the chamber A. If there were no corrugations on the piston, the diameters of the casing being larger than those of the plunger, the area of diaphragm taken from against the casing 1 could not be put against the piston without becoming folded. The excess amount of diaphragm is taken up by the corrugations 6 of the piston. By this means the diaphragm is prevented from becoming folded or broken, and the diaphragm forms in every position of the pneumatic spring an arc 14' of a large radius between the piston and the casing. The described pneumatic spring is of that type in which the effective area of the diaphragm increases with the increase of the load as the two members approach one another. But the invention may as well be applied to any pneumatic spring in which a pneumatic diaphragm is arranged within a rigid receptacle and coöperating with a plunger. If the cylinder and the plunger are made of circular cross-section, the plunger is corrugated all around.

While I have thus described my invention, I wish it to be distinctly understood, that I do not limit myself to the exact details shown and described, as these might be varied widely without departing from the spirit of my invention.

I claim:

1. In a pneumatic spring, a cylinder member, a piston member and a diaphragm between the members, the area of the cross-section of said piston being limited through an undulated line.

2. In a pneumatic spring a cylinder member, a piston member and a diaphragm between the members and corrugations provided on the surface of the piston member.

3. In a pneumatic spring a cylinder member, a piston member and a diaphragm between the members, the effective area of the diaphragm increasing with the increase of the load as the two members approach one another, and corrugations provided on the surface of the piston member.

4. In a pneumatic spring a cylinder member having diameters transverse to one another of different length, a piston member, a diaphragm between the members and corrugations provided on the longitudinal walls of said piston member, the longitudinal walls of both members being parallel, while the lateral walls of both members diverge from one another toward the interior of the cylinder member.

In testimony whereof I affix my signature in presence of two witnesses.

JOSEF HOFMANN.

Witnesses:
THEODORE F. DWIGHT,
WILLIAM S. MCCOY.